United States Patent
Kai et al.

(10) Patent No.: US 8,530,046 B2
(45) Date of Patent: Sep. 10, 2013

(54) ADHESIVE SHEET FOR PROTECTING COATING FILM

(75) Inventors: Makoto Kai, Ibaraki (JP); Kenichi Shibata, Ibaraki (JP); Mitsuyoshi Shirai, Ibaraki (JP); Masanori Uesugi, Ibaraki (JP); Hidenori Suzuki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 294 days.

(21) Appl. No.: 12/992,498

(22) PCT Filed: May 14, 2009

(86) PCT No.: PCT/JP2009/059007
§ 371 (c)(1), (2), (4) Date: Nov. 12, 2010

(87) PCT Pub. No.: WO2009/139446
PCT Pub. Date: Nov. 19, 2009

(65) Prior Publication Data
US 2011/0064946 A1   Mar. 17, 2011

(30) Foreign Application Priority Data

May 14, 2008  (JP) ................. 2008-126716

(51) Int. Cl.
*B32B 27/08*   (2006.01)
*B32B 27/26*   (2006.01)
*B32B 27/30*   (2006.01)
*B32B 27/40*   (2006.01)

(52) U.S. Cl.
USPC ........ 428/354; 428/420; 428/421; 428/423.1; 428/522

(58) Field of Classification Search
None
See application file for complete search history.

(56) References Cited

U.S. PATENT DOCUMENTS

| | | | |
|---|---|---|---|
| 5,304,617 A | 4/1994 | Kodama et al. | |
| 5,965,256 A | 10/1999 | Barrera | |
| 2003/0170443 A1 | 9/2003 | Kobe et al. | |

FOREIGN PATENT DOCUMENTS

| CN | 1617914 A | 5/2005 |
|---|---|---|
| JP | 59-041376 A | 3/1984 |
| JP | 63-110265 A | 5/1988 |
| JP | 01-297410 A | 11/1989 |
| JP | 3-146510 A | 6/1991 |
| JP | 2001-520127 A | 10/2001 |
| JP | 2003-096140 A | 4/2003 |
| JP | 2005-517078 A | 6/2005 |
| JP | 2005-272558 A | 10/2005 |

OTHER PUBLICATIONS

Chinese Office Action for corresponding Application No. 200980117232.2, issued Nov. 9, 2012.
Japanese Office Action for corresponding Application No. 2009-117706 issued Jun. 21, 2013.

*Primary Examiner* — Ramsey Zacharia
(74) *Attorney, Agent, or Firm* — Sughrue Mion, PLLC

(57) ABSTRACT

To provide an adhesive sheet for protecting coating films which is excellent in the adhesion between a coating layer and a composite film, and has weather resistance. The adhesive sheet for protecting coating films is one comprising a base layer and an adhesive layer, and the base layer has a coating layer produced by using the fluoroethylene vinyl ether alternating copolymer having a specific structure on one surface of a composite film containing an acrylic polymer and a urethane polymer. It is preferable that the coating layer is cross-linked with a composite film and has cross-linked points.

15 Claims, No Drawings

ADHESIVE SHEET FOR PROTECTING COATING FILM

TECHNICAL FIELD

The present invention relates to an adhesive sheet for protecting coating films, particularly to an adhesive sheet for protecting coating films having a composite film containing an acrylic-based polymer and a urethane polymer.

BACKGROUND ARTS

A composite film having an acrylic-based polymer and a urethane polymer has been known as a film having both high strength and high elongation at break. In JP 2001-520127 W, a multi-layered film comprising an interpenetrating polymer network layer (IPN layer), and at least one fluorine-containing polymer layer is disclosed as a surface protection film of automobiles and the like. The IPN layer in the multi-layered film makes use of an IPN composite of a urethane polymer and an acrylic polymer, and is prepared by applying a mixture of an acrylic monomer, an acrylic cross-linking agent, and a urethane cross-linked precursor of a polyol and polyisocyanate to a base material, polymerizing and cross-linking the acrylic monomer and the polyol/polyisocianate being the urethane precursor with heating in the manner of nonintervention, each.

According to this method, there is a merit that limitation (restriction) of types, combinations and blending proportions of the monomers to be used is difficult to be generated, but there is a problem in productivity because the urethane polymerization is a polyaddition reaction which proceeds slowly in comparison with such a chain reaction as the acryl.

In order to solve the problem as to productivity, when an IPN layer was tried to be obtained by utilizing the sequential synthesis and photopolymerization as disclosed in JP 2003-96140 A, the cross-linked urethane polymer became swelled in the presence of the acrylic monomer and the cross-linking agent to thereby increase a viscosity of the syrup remarkably, and accordingly, there arose a problem that application to a base material by coating or casting was very difficult.

In addition, when cars drive, there is a case where powder dusts, pebbles, and the like clash to a coating surface of body. Particularly when cars drive on a rough road or roads where rock salt, sand, gravel and the like are sprayed for removing snow or the like in cold districts, there is a problem that the coating surface tends to be damaged and rust is generated from the damaged portion of the coating surface. In automobile fields, in order to prevent the coating surface of an automobile body from damage, a transparent adhesive tape may be applied thereto. A polyurethane base material is used as a base material of that transparent adhesive tape (for instance, refer to JP 59-41376 A, JP 2005-272558 A).

However, it is known that a polyurethane generates a coloring substance exhibiting conjugate structure, and a nitrogen-containing coloring substance through photoreaction. Therefore a film containing a polyurethane is initially colorless and transparent, but when left outdoors, there is a case where the film turns yellow because of being exposed to ultraviolet rays and its glossy feeling disappears to reduce good appearance.

Although an adhesive sheet in which a coating layer composed of a fluororesin is provided on a base material is also known, adhesion strength between the base material and the coating layer is not sufficient.

PRIOR PUBLICATIONS

Patent Documents

Patent Document 1: JP 2001-520127 W
Patent Document 2: JP2003-96140 A
Patent Document 3: JP 59-41376 A
Patent Document 4: JP 2005-272558 A

DISCLOSURE OF THE INVENTION

Problem to be Solved by the Invention

The present invention has been made to solve the aforementioned problems, and an object of the present invention is to provide an adhesive sheet for protecting coating films which is excellent in the adhesion between a coating layer and a composite film, and has weather resistance.

Means for Solving the Problem

The adhesive sheet for protecting coating films according to the present invention is an adhesive sheet for protecting coating films which comprises a base layer and an adhesive layer, wherein the base layer has a coating layer prepared by using a fluoroethylene vinyl ether alternating copolymer represented by the following formula (I) on one surface of a composite film containing an acrylic-based polymer and a urethane polymer.

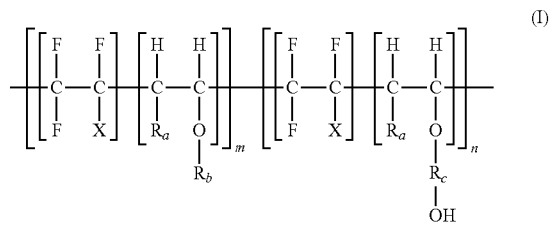

wherein X represents fluorine, chlorine or bromine, $R_a$ represents hydrogen or an alkyl group of C1-C10, $R_b$ represents an alkyl group of C1-C16, $R_c$ represents an alkylene group of C1-C16. m and n each represent an integer and is selected so that a weight average molecular weight of the fluoroethylene vinyl ether alternating copolymer is within the range of 1,000 to 2,000,000.

In the present invention, a preferable structure is that the composite film and the coating layer are cross-linked and the structure has cross-linked points.

In the present invention, the cross-linked points can be formed by forming the coating layer with a solution which is prepared by dissolving the fluoroethylene vinyl ether alternating copolymer in a solvent and then adding an isocyanate thereto, and forming the composite film by applying a coating solution for forming the composite film on the coating layer.

Alternately, the cross-linked points can be formed by forming the coating layer through the use of a mixture which is prepared by adding a solution prepared by dissolving the fluoroethylene vinyl ether alternating copolymer in a solvent to a reaction solution obtained by causing a hydroxyl-containing acrylic-based monomer to react with a polyfunctional isocyanate, and forming the composite film by applying a coating solution for forming the composite film on the coating layer.

In the present invention, it is preferable that the composite film is produced through the use of a coating solution for forming composite films prepared by adding a photopolymerization initiator to a solution containing an acrylic-based monomer and a urethane polymer produced by causing a diol to react with a diisocyanate in the acrylic monomer.

In the present invention, it is preferable that an adhesive which forms the adhesive layer contains at least one type of copolymers of at least one selected from the group consisting of 2-ethylhexyl acrylate and isononyl acrylate.

In the present invention, it is preferable that the adhesive sheet for protecting coating films is used for being stuck to an outer coating surface of transport machines.

Effects of the Invention

According to the present invention, an adhesive sheet for protecting coating films having excellent in the adhesion between a coating layer and a composite film and having weather resistance can be achieved.

MODE FOR CARRYING OUT THE INVENTION

In the following, the present invention will be explained in detail.

The adhesive sheet for protecting coating films of the present invention has a base layer and an adhesive layer, and the base layer includes a composite film provided with a particular coating layer.

The composite film contains a (meth)acrylic-based polymer and a urethane polymer. In the composite film, it is preferable that a weight ratio of the (meth)acrylic-based polymer and the urethane polymer, i.e. the (meth)acrylic-based polymer/the urethane polymer is within the range of 1/99 to 80/20. When the content of the (meth)acrylic polymer is less than 1/99, there is a case where a viscosity of a precursor mixture increases to thereby make workability worse, and when it is more than 80/20, there is a case where flexibility and strength as a film can not be obtained.

In the present invention, it is preferable that the (meth)acrylic-based polymer is produced by using an acrylic component which contains at least a (meth)acrylic acid-based monomer, and a monofunctional (meth)acrylic-based monomer, particularly preferable that the (meth)acrylic-based polymer is manufactured by using a monofunctional (meth) acrylic-based monomer having a glass transition temperature (Tg) of its homopolymer of 0° C. or more. Further in the present invention, it is preferable that the (meth)acrylic-based polymer is produced by using an acrylic component which further contains a monofunctional (meth)acrylic-based monomer having a glass transition temperature (Tg) of its homopolymer of less than 0° C.

In the present invention, the (meth)acrylic acid-based monomer is a (meth)acrylic-based monomer having carboxyl group, and includes, for example, acrylic acid, methacrylic acid, maleic acid, crotonic acid, or the like. Among them, acrylic acid is most preferable. A content of the (meth)acrylic acid-based monomer is 1% or more by weight and 15% or less by weight, and preferably 2% or more by weight and 10% or less by weight in the precursor of the composite film mentioned hereinafter. When the content of the (meth)acrylic acid-based monomer is less than 1% by weight, it takes a long time to react and it is very difficult to make a film, and there is a case where a problem that a strength of the resulting film is insufficient arises. When the content of the (meth)acrylic acid-based monomer is more than 15% by weight, a water absorption of the resulting film becomes larger and there is a case where a problem arises in water resistance. In the present invention, the (meth)acrylic acid-based monomer remarkably influences a compatibility with the urethane component and the acrylic component, and is the essential constituent having an extremely important function.

Meanwhile, in the present invention, the concept of "film" includes a sheet, and the concept of "sheet" includes a film. Further, in the present invention, the word "(meth)acryl" such as (meth)acrylic-based polymer or (meth)acrylic acid-based monomer is used as the general concept of methacryl and acryl. Further the word "acrylic" is used as the concept that includes methacrylic, unless there is a problem based on general common sense.

In the present invention, the monofunctional (meth)acrylic-based monomer having a Tg of 0° C. or more includes, for example, acryloyl morpholine, isobornyl acrylate, dicyclopentanyl acrylate, t-butyl acrylate, cyclohexyl acrylate, lauryl acrylate, and the like. These can be used alone or in combination of two or more.

In the present invention, as the monofunctional (meth)acrylic-based monomer having a Tg of 0° C. or more, it is preferable to use at least one selected from the group consisting of acryloyl morpholine, isobornyl acrylate and dicyclopentanyl acrylate, more preferable to use acryloyl morpholine and/or isobornyl acrylate, or acryloyl morpholine and/or dicyclopentanyl acrylate, and particularly preferable to use isobornyl acrylate.

The content of the monofunctional (meth)acrylic monomer having a Tg of 0° C. or more in the acrylic component is preferably 20% or more by weight and 99% or less by weight, and more preferably 30% or more by weight and 98% or less by weight. When the content of the monofunctional (meth)acrylic-based monomer is less than 20% by weight, there is a case where a problem that the strength of the film is insufficient arises, and when more than 99% by weight, there is a case where the film becomes too rigid to be fragile.

In the present invention, the monofunctional (meth)acrylic-based monomer having a Tg of less than 0° C. includes, for example, n-butyl acrylate, 2-ethylhexyl acrylate, isooctyl acrylate, isobutyl acrylate, 2-methoxyethyl acrylate, tetrahydrofurfuryl acrylate, phenoxyethyl acrylate, ethoxyethyl acrylate, 3-methoxybutyl acrylate, and the like. These may be used alone or in combination of two or more.

In the present invention, as the monofunctional (meth)acrylic-based monomer having a Tg of less than 0° C., it is most preferable to use n-butyl acrylate.

The monofunctional (meth)acrylic-based monomer having a Tg of less than 0° C. may not be contained (content being 0% by weight). When contained, the content in the acrylic component is preferably more than 0% by weight and 50% or less by weight, more preferably more than 0% by weight and 45% or less by weight. When the content of the monofunctional (meth)acrylic-based monomer is more than 50% by weight, there is a case where a problem that a strength of the film is insufficient arises.

The (meth)acrylic-based monomer is optionally determined, with respect to its type, combination, amount to be used and the like, in consideration of compatibility with the urethane, polymerization activity at the time of photocuring by radioactive rays and the like, and properties of the high molecular weight compounds obtained.

Further, together with the acrylic-based monomers, monomers such as vinyl acetate, vinyl propionate, styrene, acrylamide, methacrylamide, mono- or diesters of maleic acid and derivatives thereof, N-methylolacrylamide, glycidyl acrylate, glycidyl methacrylate, N,N-dimethylaminoethyl acrylate, N,N-dimethylaminopropylmethacrylamide, 2-hydroxypropyl acrylate, N,N-dimethylacrylamide, N,N-diethylacrylamide, imide acrylate, N-vinylpyrrolidone, oligoester acrylate, ε-caprolactone acrylate, dicyclopentanyl (meth)acrylate, dicyclopentenyl (meth)acrylate, methoxylated cyclododecatriene acrylate, and methoxyethyl acrylate may be copolymerized. The type and amount of the monomers to be copolymerized may be optionally determined in consideration of the properties and the like of the resulting composite film.

Further, other polyfunctional monomer may be added within the range not damaging the properties of the resulting composite film. The polyfunctional monomer includes, for example, ethylene glycol di(meth)acrylate, propylene glycol di(meth)acrylate, hexanediol di(meth)acrylate, neopentyl glycol di(meth)acrylate, trimethylolpropane tri(meth) acrylate, pentaerythritol tri(meth)acrylate, dipentaerythritol hexa(meth)acrylate, urethane acrylate, epoxy acrylate, and polyester acrylate, and the most preferable polyfunctional monomer is trimethylolpropane tri(meth)acrylate.

1 part or more by weight and 20 parts or less by weight of the polyfunctional monomer can be contained relative to 100 parts by weight of the acrylic-based monomer. When the content of the polyfunctional monomer is 1 part or more by weight, the cohesive force of the composite film is sufficient, and when the content of the polyfunctional monomer is 20 parts or less by weight, the elastic modulus of the polymer obtained does not increase too much, and thus the resulting composite film can follow up the irregularity of the surface of an adherend.

The urethane polymer is obtained by causing a diol to react with a diisocyanate. A catalyst is used generally for the reaction of the hydroxyl group of the diol and the isocyanate. In the present invention, the reaction can be accelerated without using a catalyst which causes environmental burdens such as dibutyl tin dilaurate or tin octoate.

A low molecular weight diol includes dihydric alcohols such as ethylene glycol, diethylene glycol, propylene glycol, butylene glycol, and hexamethylene glycol.

A high molecular weight diol includes ethylene oxide, propylene oxide, a polyether polyol obtained by addition polymerization of tetrahydrofuran or the like; or a polyester polyol composed of a polycondensation product of an alcohol such as the aforementioned dihydric alcohol, 1,4-butanediol, or 1,6-hexanediol and a dibasic acid such as adipic acid, azelaic acid, or sebacic acid; an acrylic polyol; a carbonate polyol; an epoxy polyol; a caprolactone polyol; or the like. Among them, for example, polyoxytetramethylene glycol (PTMG), polyalkylene carbonate diol (PCD), and the like are preferably used.

The acrylic polyol includes a copolymer of a hydroxyl group-containing monomer, in addition to a copolymer of a hydroxyl group-containing substance and an acrylic-based monomer, or the like. The epoxy polyol includes an amine-modified epoxy resin, or the like.

In the present invention, the urethane polymer does not contain any cross-linked structure. The diol to be used for forming the urethane polymer is preferably a linear diol. As far as the condition that the requirement of not causing the urethane polymer to form any cross-linked structure is satisfied, the diol may be a diol having a side chain or a diol having a branched structure. Namely, the urethane polymer which constitutes the composite film according to the present invention does not contain any cross-linked structure, and thus is structurally completely different from the IPN structure.

In the present invention, the aforementioned diol can be used alone or in combinations of two or more in consideration of the solubility in the acrylic-based monomer, reactivity with isocyanate, and the like. When strength is required, it is effective to increase the amount of urethane hard segment by use of a low molecular weight diol. When importance is posed on elongation, it is preferable to use a diol having a large molecular weight alone. Furthermore, the polyether polyol generally is inexpensive and has good water resistance. The polyester polyol has high strength. In the present invention, the type and amount of the polyol can be selected freely depending on the application and purpose. The type, molecular weight, and amount of the polyol to be used may be selected appropriately also from the viewpoints of the property of the base material to be applied, reactivity with isocyanate, compatibility with the acrylic, and the like.

As the diisocyanate, aromatic, aliphatic, or alicyclic diisocyanate, and a dimer, a trimer or the like of these diisocyanates may be used. The aromatic, aliphatic, and alicyclic diisocyanate includes, for example, tolylene diisocyanate (TDI), diphenylmethane diisocyanate (NIDI), xylylene diisocyanate (XDI), naphthylene diisocyanate (NDI), phenylene diisocyanate (PPDI), m-tetramethylxylylene diisocyanate (TNI), methylcyclohexane diisocyanate (hydrogenated TDI), dicyclohexylmethane diisocyanate (hydrogenated NIDI), cyclohexane diisocyanate (hydrogenated PPDI), bis(isocyanatomethyl) cyclohexane (hydrogenated XDI), norbornene diisocyanate (NBDI), isophorone diisocyanate (IPDI), hexamethylene diisocyanate (HDI), butane diisocyanate, 2,4-trimethylhexamethylene diisocyanate, 2,4,4-trimethylhexamethylene diisocyanate, or the like. In addition, a dimmer, a trimer of these, or polyphenylmethane diisocyanate may be used. The trimer of these includes isocyanurate type, biuret type, allophanate type, or the like, and may be used appropriately.

Among them, there is particularly preferably used an aliphatic or alicyclic diisocyanate such as methylcyclohexane diisocyanate (hydrogenated TDI), dicyclohexylmethane diisocyanate (hydrogenated MDI), cyclohexane diisocyanate (hydrogenated PPDI), bis(isocyanatomethyl) cyclohexane (hydrogenated XDI), norbornene diisocyanate (NBDI), isophorone diisocyanate (IPDI), hexamethylene diisocyanate (HDI), butane diisocyanate, 2,4-trimethylhexamethylene diisocyanate, 2,4,4-trimethylhexamethylene diisocyanate. The use of an aromatic diisocyanate having benzene ring makes it easy to produce a coloring substance having a conjugated structure at photoreaction, which is not preferable. In the present invention, the aliphatic or alicyclic diisocyanate containing no benzene ring which is a type difficult to be yellow or a non-yellowing type, is used preferably.

These diisocyanates may be used alone or in combination. The type, combination and the like of the diisocyanate may be appropriately selected in consideration of the properties of the support to which the composite film or the like is applied (coated), the solubility in the acrylic-based monomer, the reactivity with hydroxyl group, and the like.

In the present invention, the urethane polymer is preferably formed by using at least one diisocyanate selected from the group consisting of hexamethylene diisocyanate (HDI), hydrogenated tolylene diisocyanate (HTDI), hydrogenated 4,4-diphenylmethane diisocyanate (HMDI), isophorone diisocyanate (IPDI), and hydrogenaed xylylene diisocyanate (HXDI), and the most preferable diisocyanate is hydrogenaed xylylene diisocyanate.

In the present invention, with respect to the use amounts of the diol component and the diisocyanate component used for forming the urethane polymer, an NCO/OH ratio (equivalent ratio) is preferably 1.1 or more, and 2.0 or less, more preferably 1.12 or more, and 1.60 or less, most preferably 1.15 or more, and 1.40 or less. When the NCO/OH (equivalent ratio)

is less than 1.1, the molecular weight of the resulting urethane polymer is too large so that a viscosity of the precursor of the composite film (syrup solution) becomes high. Therefore, there is a case where workability in the following sheet making step becomes difficult. Also, when the NCO/OH (equivalent ratio) is more than 2.0, the molecular weight of the resulting urethane polymer is small, and thus, a breaking strength tends to be lowered.

In the present invention, with respect to a ratio of the acrylic component to the urethane component which form the composite film, the weight ratio of the acrylic component/urethane component is 0.25 or more, and 4.00 or less, more preferably 0.429 or more and 2.333 or less, most preferably 0.538 or more and 1.857 or less. When the acrylic component/urethane component is less than 0.25, a viscosity of the syrup solution becomes large, and thus, there is a case where workability in the following sheet making step becomes difficult. Furthermore, when the acrylic component/urethane component is more than 4.00, the amount of the urethane polymer in the composite film is less than 25% to lower a breaking strength, and thus, there is a case where the film obtained cannot be practically used.

To the urethane polymer, a hydroxyl-containing acrylic monomer may be added. By adding the hydroxyl-containing acrylic monomer, (meth)acryloyl group can be introduced at the end of the molecule of the urethane prepolymer to be provided with copolymerizable property with the (meth) acrylic-based monomer, and to increase compatibility between the urethane component and the acrylic component, which results in the improvement of a S-S property for evaluating the breaking strength and the like. The hydroxyl-containing acrylic monomer used herein includes hydroxyethyl (meth)acrylate, hydroxypropyl (meth)acrylate, hydroxybutyl (meth)acrylate, hydroxyhexyl (meth)acrylate, or the like. The amount of the hydroxyl-containing acrylic monomer to be used relative to 100 parts by weight of the urethane polymer is preferably 0.1 to 10 parts by weight, more preferably 1 to 5 parts by weight.

In the present invention, the composite film can contain commonly used additives, for example, ultraviolet absorbers, antioxidants, fillers, pigments, colorants, flame retardants, antistatic agents, light stabilizer as necessary within the range deteriorating the effects of the present invention. These additives are used at normal amounts depending on their type. These additives may be added in advance prior to the polymerization reaction of the diisocyanate and the diol. Alternatively, they may be added prior to polymerization of the urethane polymer and the acrylic monomer, each.

The ultraviolet absorbent used in the present invention includes, for example, as a benzotriazole-based ultraviolet absorber, 2-(2-hydroxy-5-tert-butylphenyl)-2H-benzotriazole, an esterification product of benzene propanoic acid and 3-(2H-benzotriazole-2-yl)-5-(1,1-dimethylethyl)-4-hydroxy(C7-C9 branched and straight-chain alkyl), a mixture of octyl-3-[3-tert-butyl-4-hydroxy-5-(5-chloro-2H-benzotriazole-2-yl)phenyl] propionate and 2-ethylhexyl-3-[3-tert-butyl-4-hydroxy-5-(5-chloro-2H-benzotriazole-2-yl)phenyl] propionate, 2-(2H-benzotriazole-2-yl)-4,6-bis(1-methyl-1-phenylethyl) phenol, 2-(2H-benzotriazole-2-yl)-6-(1-methyl-1-phenylethyl)-4-(1,1,3,3-tetramethylbutyl)phenol, a reaction product of methyl-3-(3-(2H-benzotriazole-2-yl)-5-tert-butyl-4-hydro xyphenyl) propionate and polyethylene glycol 300, 2-(2H-benzotriazole-2-yl)-p-cresol, 2-[5-chloro (2H)-benzotriazole-2-yl]-4-methyl-6-(tert-butyl)phenol, 2-(2H-benzotriazole-2-yl)-4,6-di-tert-pentylphenol, 2-(2H-benzotriazole-2-yl)-4-(1,1,3,3-tetramethylbutyl)phenol, 2-2'-methylene-bis[6-(2H-benzotriazole-2-yl)-4-(1,1,3,3-tetramethylbutyl)phenol], a reaction product of methyl-3-(3-(2H-benzotriazole-2-yl)-5-tert-butyl-4-hydro xyphenyl) propionate and polyethylene glycol 300, 2-(2H-benzotriazole-2-yl)-6-dodecyl-4-methylphenol, 2-[2-hydroxy-3-(3,4,5,6-tetrahydrophthalimido-methyl)-5-methylphenyl] benzotriazole, 2,2'-methylene-bis[6-(benzotriazole-2-yl)-4-tert-octylphenol, or the like.

Also, a hydroxyphenyltriazine type ultraviolet absorber includes, for example, a reaction product of 2-(4,6-bis(2,4-dimethylphenyl)-1,3,5-triazine-2-yl)-5-hydroxyphenyl and [(C10-C16, mainly C12-C13 alkyloxy)methyl]oxirane, a reaction product of 2-(2,4-dihydroxyphenyl)-4,6-bis-(2,4-dimethylphenyl)-1,3,5-triazine and an ester of (2-ethyl-hexyl)-glycidic acid, 2,4-bis[2-hydroxy-4-butoxyphenyl]-6-(2,4-dibutoxyphenyl)-1,3,5-triazine, 2-(4,6-diphenyl-1,3,5-triazine-2-yl)-5-[(hexyl)oxy]-phenol, 2-(2-hydroxy-4-[1-octyloxycarbonylethoxy]phenyl)-4,6-bis(4-phenylphenyl)-1,3,5-triazine, or the like.

The benzophenone-based ultraviolet absorber includes, for example, 2-hydroxy-4-n-octyloxybenzophenone, or the like.

The benzoate-based ultraviolet absorber includes, for example, 2,4-di-tert-butylphenyl-3,5-di-tert-butyl-4-hydroxybenzo ate, or the like.

Commercially available benzotriazole-based ultraviolet absorbers are, for example, "TINUVIN PS" manufactured by CIBA JAPAN INC. as 2-(2-hydroxy-5-tert-butylphenyl)-2H-benztriazole, "TINUVIN 384-2" manufactured by CIBA JAPAN INC. as the esterification product of benzene propanoic acid and 3-(2H-benzotriazole-2-yl)-5-(1,1-dimethylethyl)-4-hydrox y(C7-C9 branched and straight-chain alkyl), "TINUVIN 109" manufactured by CIBA JAPAN INC. as the mixture of octyl-3-[3-tert-butyl-4-hydroxy-5-(5-chloro-2H-benzotria zole-2-yl)phenyl] propionate and 2-ethylhexyl-3-[3-tert-butyl-4-hydroxy-5-(5-chloro-2H-benzotriazole-2-yl) phenyl] propionate, "TINUVIN 900" manufactured by CIBA JAPAN INC. as 2-(2H-benzotriazole-2-yl)-4,6-bis(1-methyl-1-phenylethyl) phenol, "TINUVIN 928" manufactured by CIBA JAPAN INC. as 2-(2H-benzotriazole-2-yl)-6-(1-methyl-1-phenylethyl)-4-(1,1,3,3-tetramethylbutyl)phenol, "TINUVIN 1130" manufactured by CIBA JAPAN INC. as the reaction product of methyl-3-(3-(2H-benzotriazole-2-yl)-5-tert-butyl-4-hydro xyphenyl) propionate and polyethylene glycol 300, "TINUVIN P" manufactured by CIBA JAPAN INC. as 2-(2H-benzotriazole-2-yl)-p-cresol, "TINUVIN 326" manufactured by CIBA JAPAN INC. as 2-[5-chloro (2H)-benzotriazole-2-yl]-4-methyl-6-(tert-butyl)phenol, "TINUVIN 328" manufactured by CIBA JAPAN INC. as 2-(2H-benzotriazole-2-yl)-4,6-di-tert-pentylphenol, "TINUVIN 329" manufactured by CIBA JAPAN INC. as 2-(2H-benzotriazole-2-yl)-4-(1,1,3,3-tetramethylbutyl)phenol, "TINUVIN 360" manufactured by CIBA JAPAN INC. as 2-2'-methylene-bis[6-(2H-benzotriazole-2-yl)-4-(1,1,3,3-tetramethylbutyl)phenol], "TINUVIN 213" manufactured by CIBA JAPAN INC. as the reaction product of methyl-3-(3-(2H-benzotriazole-2-yl)-5-tert-butyl-4-hydro xyphenyl) propionate and polyethylene glycol 300, "TINUVIN 571" manufactured by CIBA JAPAN INC. as 2-(2H-benzotriazole-2-yl)-6-dodecyl-4-methylphenol, "Sumisorb 250" manufactured by SUMITOMO CHEMICAL as 2-[2-hydroxy-3-(3,4,5,6-tetrahydrophthalimido-methyl)-5-methylphenyl]benzotriazole, "ADKSTAB LA31" manufactured by ADEKA as 2,2'-methylene-bis[6-(benzotriazole-2-yl)-4-tert-octylph enol, and the like.

Also, commercially available hydroxyphenyltriazine-based ultraviolet absorbers are, for example, "TINUVIN 400" manufactured by CIBA JAPAN INC. as the reaction product of 2-(4,6-bis(2,4-dimethylphenyl)-1,3,5-triazine-2- yl)-5-hd roxyphenyl and [(C10-C16, mainly C12-C13 alkyloxy)methyl]oxirane, "TINUVIN 405" manufactured by CIBA JAPAN INC. as the reaction product of 2-(2,4-dihydroxyphenyl)-4,6-bis-(2,4-dimethylphenyl)-1,3,5-triazine and the ester of (2-ethylhexyl)-glycidic acid, "TINUVIN 460" manufactured by CIBA JAPAN INC. as 2,4-bis[2-hydroxy-4-butoxyphenyl]-6-(2,4-dibutoxyphenyl)-1,3,5-triazine, "TINUVIN 1577" manufactured by CIBA JAPAN INC. as 2-(4,6-diphenyl-1,3,5-triazine-2-yl)-5-[(hexyl)oxy]-phenol, "TINUVIN 479" manufactured by CIBA JAPAN INC. as 2-(2-hydroxy-4-[1-octyloxycarbonylethoxy]phenyl)-4,6-bis (4-phenylphenyl)-1,3,5-triazine, and the like.

Commercially available benzophenone-based ultraviolet absorbers are, for example, "CHIMASSORB 81" manufactured by CIBA JAPAN INC., and the like. Furthermore, the benzoate-based ultraviolet absorbers are, for example, "TINUVIN 120" manufactured by CIBA JAPAN INC. as 2,4-di-tert-butylphenyl-3,5-di-tert-butyl-4-hydroxybenzo ate, and the like.

In the present invention, the aforementioned ultraviolet absorbers may be used alone or in combination of two or more.

The total amount of the ultraviolet absorber to be used is preferably 0.1% or more by weight and 4.0% or less by weight, more preferably 0.5% or more by weight and 2.0% or less by weight relative to 100% by weight of the precursor of the composite film. When the content of the ultraviolet absorber is 0.1% or more by weight, the absorption of ultraviolet ray which causes degradation and coloration is sufficient, and when 4.0% or less by weight, the coloration due to the ultraviolet absorber itself would not be caused.

The light stabilizer used in the present invention is preferably a hindered amine light stabilizer (HALS). Preferred hindered amine light stabilizers are, for example, compounds represented by the following formula (II).

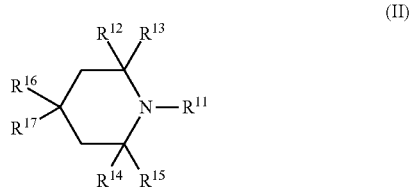

(II)

wherein $R^{11}$ is an alkylene group, an alkyl group, ether group, each of $R^{12}$, $R^{13}$, $R^{14}$, $R^{15}$, $R^{16}$, $R^{17}$ is independently hydrogen, an alkyl group, an alkoxy group which may be substituted.

Commercially available hindered amine light stabilizers are, for example, "TINUVIN 622" manufactured by CIBA JAPAN INC. as a light stabilizer of a polymerization product of dimethyl succinate and 4-hydroxy-2,2,6,6-tetramethyl-1-pyperdine ethanol, "TINUVIN 119" manufactured by CIBA JAPAN INC. as a light stabilizer of a one by one reaction product of the polymerization product of dimethyl succinate and 4-hydroxy-2,2,6,6-tetramethyl-1-pyperdine ethanol with N, N', N", N'"-tetrakis-(4,6-bis-(butyl-(N-methyl-2,2,6,6-tetramet hylpiperidine-4-yl)amino)-triazine-2-yl)-4,7-diazadecane-1,10-diamine, "TINUVIN 2020" manufactured by CIBA JAPAN INC. as a light stabilizer of a polycondensation product of dibutylamine·1,3-triazine·N, N'-bis(2,2,6,6-tetramethyl-4-piperidyl-1,6-hexamethylene diamine and N-(2, 2,6,6-tetramethyl-2-piperidyl)butylamine, "TINUVIN 944" manufactured by CIBA JAPAN INC. as a light stabilizer of poly[{6-(1,1,3,3-tetramethylbutyl)amino-1,3,5-triazine-2,4-diyl}{2,2,6,6-tetramethyl-4-piperidyl}imino]hexamethylene{(2,6,6-tetramethyl-4-piperidyl)imino}), "TINUVIN 765" manufactured by CIBA JAPAN INC. as a light stabilizer of a mixture of bis(1,2,2,6,6-pentamethyl-4-piperidyl) sebacate and methyl (1,2,2,6,6-pentamethyl-4-piperidyl)sebacate, "TINUVIN 770" manufactured by CIBA JAPAN INC. as a light stabilizer of bis(2,2,6,6-tetramethyl-4-piperidyl) sebacate, "TINUVIN 123" manufactured by CIBA JAPAN INC. as a light stabilizer of a reaction product of decanedioic acid bis(2,2,6,6-tetramethyl-1-(octyloxy)-4-piperidinyl) ester (1,1-dimethylethylhydroperoxide) and octane, "TINUVIN 144" manufactured by CIBA JAPAN INC. as a light stabilizer of bis(1,2,2,6,6-pentamethyl-4-piperidyl)[[3,5-bis (1,1-dime thylethyl)-4-hydroxyphenyl]methyl]butyl malonate, "TINUVIN 152" manufactured by CIBA JAPAN INC. as a light stabilizer of a reaction product of cyclohexane and N-butyl-2,2,6,6-tetramethyl-4-piperidineamine-2,4,6-tric hloro-1,3,5-triazine peroxide with 2-ethtanolamine, "TINUVIN 292" manufactured by CIBA JAPAN INC. as a light stabilizer of a mixture of bis(1,2,2,6,6-pentamethyl-4-piperidyl) sebacate and methyl 1,2,2,6,6-pentamethyl-4-piperidyl) sebacate, and the like.

In the present invention, the aforementioned hindered amine light stabilizer can be used alone or in combination of two or more. The total amount of the hindered amine light stabilizer to be used is preferably 0.1% or more by weight and 4.0% or less by weight, more preferably 0.5% or more by weight and 2.0% or less by weight relative to 100% by weight of the precursor of the composite film. When the amount of the hindered amine light stabilizer is 0.1% or more by weight, the degradation-preventing function is sufficiently obtained, and when the amount of the hindered amine light stabilizer is 4.0% or less by weight, the coloration due to the light stabilizer itself would not be caused.

According to the present invention, to adjust the viscosity upon coating, a small amount of a solvent may be added. The solvent can be selected appropriately from commonly used solvents. Examples of such a solvent include ethyl acetate, toluene, chloroform, and dimethylformamide, and the like.

In the present invention, the composite film can be formed by using the acrylic-based monomer as a diluent, causing a diol to react with an diisocyanate in the acrylic-based monomer to thereby form a urethane polymer, coating a mixture containing the acrylic-based monomer and the urethane polymer as main components on a support (if necessary, may be peeling-treated) or the like, curing it by being irradiated with, for example, ionizing radioactive ray such as α-ray, β-ray, γ-ray, neutron beam, or electron beam, radioactive ray such as ultraviolet ray, or visible light depending on the type of a photopolymerization initiator to be used, and then peeling and removing the support or the like. Alternatively, without peeling and removing the support or the like, the composite film can be obtained in the form of a film laminated on the support.

Specifically, after the diol is dissolved in the acrylic-based monomer, a diisocyanate or the like is added to allow it to react with the diol to adjust the viscosity, and the mixture is coated, for example, on the support, or peeling-treated surface of the support, if necessary, and then curing the coating by using a low-pressure mercury lamp or the like to thereby provide the composite film. In this method, the acrylic-based monomer may be added at one time during the urethane synthesis or in several times devidedly. Alternatively, the diisocyanate is dissolved in the acrylic-based monomer, and then the diol may be caused to react with the resultant. According to this method, the molecular weight is not limited and polyurethanes having high molecular weight can be produced. Therefore, the molecular weight of the polyurethane finally obtained can be designed to a desired size.

In this case, in order to avoid the inhibition of polymerization by oxygen, a peeling-treated sheet (separator, or the like) may be placed on the mixture applied on the base material sheet or the like to shut out oxygen, or the base material may be placed in a vessel filled with an inert gas to decrease the concentration of oxygen.

In the present invention, the type of radioactive rays and the like and the type of the lamps to be used for irradiation may be selected appropriately, and low pressure lamps such as a fluorescent chemical lamp, a black light, and a bactericidal lamp, or high pressure lamps such as a metal halide lamp and a high pressure mercury lamp can be used.

The amount of irradiation of ultraviolet rays or the like can be set up optionally depending on the properties required for the film. Generally, the amount of irradiation of ultraviolet rays is selected within the range of 100 to 5,000 mJ/cm$^2$, preferably 1,000 to 4,000 mJ/cm$^2$, and more preferably 2,000 to 3,000 mJ/cm$^2$. When the dose of ultraviolet ray is less than 100 mJ/cm$^2$, there is a case where sufficient degree of polymerization may not be obtained, and when the dose of ultraviolet ray is more than 5,000 mJ/cm$^2$, there is a case where deterioration occurs.

Further, the temperature at which the film is irradiated with ultraviolet rays or the like is not particularly limited and can be set up optionally. However, when the temperature is too high, termination reaction easily occur due to the heat of polymerization and thus easily cause lowering of performances. Usually, the temperature is 70° C. or less, preferably 50° C. or less, and more preferably 30° C. or less.

The mixture containing the urethane polymer and the acrylic-based monomer as main components contains a photopolymerization initiator. The photopolymerization initiators to be used are not particularly limited, and include, for example, ketal-based photopolymerization initiators, α-hydroxyketones-based photopolymerization initiators, α-aminoketones-based photopolymerization initiators, acylphosphineoxide-based photopolymerization initiators, benzophenone-based photopolymerization initiators, tioxanthone-based photopolymerization initiators, benzoinether-based photopolymerization initiators, acetophenone-based photopolymerization initiators, aromatic sulfonylchloride-based photopolymerization initiators, photoactive oxime-based photopolymerization initiators, benzoin-based photopolymerization initiators, benzyl-based photopolymerization initiators, and the like.

The ketal-based photopolymerization initiators include, for example, 2,2-dimethoxy-1,2-diphenylethane-1-on (commercially available being "IRGACURE 651" manufactured by CIBA SPECIALTY CHEMICALS Inc., and the like), and the like.

The α-hydroxyketones-based photopolymerization initiators include, for example, 1-hydroxycyclohexyl phenyl ketone (commercially available being "IRGACURE 184" manufactured by CIBA JAPAN INC., and the like), 2-hydroxy-2-methyl-1-phenylpropane-1-one (commercially available being "DAROCURE 1173" manufactured by CIBA JAPAN INC., and the like), 1-[4-(2-hydroxyethoxy)-phenyl]-2-hydroxy-2-methyl-1-propane-1-one (commercially available being "IRGACURE 2959" manufactured by CIBA JAPAN INC., and the like), and the like.

The α-aminoketones-based photopolymerization initiators include, for example, 2-methyl-1-[4-(methyltio)phenyl]-2-morpholinopropan-1-one (commercially available being "IRGACURE 907" manufactured by CIBA JAPAN INC., and the like), 2-benzyl-2-dimethylamino-1-(4-morpholinophenyl)-butane-1 (commercially available being "IRGACURE 369" manufactured by CIBA JAPAN INC., and the like), and the like.

The acylphosphineoxide-based photopolymerization initiators include, for example, 2,4,6-trimethylbenzoyldiphenylphosphine oxide (commercially available being "LUCIRIN TPO" manufactured by BASF, and the like), and the like.

The benzoinether-based photopolymerization initiators include, for example, benzoin methyl ether, benzoin ethyl ether, benzoin propyl ether, benzoin isopropyl ether, benzoin isobutyl ether, 2,2-dimethoxy-1,2-diphenylethane-1-one, anisole methyl ether, and the like.

The acetophenone-based photopolymerization initiators include, for example, 2,2-diethoxyacetophenone, 2,2-dimethoxy-2-phenylacetophenone, 1-hydroxycyclohexyl phenyl ketone, 4-phenoxydichloroacetophenone, 4-(t-butyl) dichloroacetophenone, and the like.

The aromatic sulfonylchloride-based photopolymerization initiators include, for example, 2-naphthalenesulfonylchloride and the like, and the photoactive oxime-based photopolymerization initiators include, for example, 1-phenyl-1,1-propnanedione-2-(o-ethoxycarbonyl)-oxime and the like.

The benzoin-based photopolymerization initiators include, for example, benzoin and the like, and the benzyl-based photopolymerization initiators include, for example, benzyl and the like.

The benzophenone-based photopolymerization initiators include, for example, benzophenone, benzoylbenzoic acid, 3,3'-dimethyl-4-methoxybenzophenone, polyvinylbenzophenone, α-hydoroxycyclohexyl phenyl ketone, and the like.

The tioxanthone-based photopolymerization initiators include, for example, tioxanthone, 2-chlorotioxanthone, 2-methyltioxanthone, 2,4-dimethyltioxanthone, isopropyltioxanthone, 2,4-diisopropyltioxanthone, dodecyltioxanthone, and the like.

The thickness of the base layer according to the present invention can be appropriately selected depending to the objects and the like, for instance, the type and portion of the subject to be coated and protected. The thickness is not particularly limited, and is preferably 100 μm or more, more preferably 150 μm or more, most preferably 200 μm or more. Furthermore, the upper limit of the thickness is preferably about 1 mm. The thickness of the composite film which constitutes the base layer is preferably about 50 to 800 μm, more preferably about 100 to 600 μm, in the case of chipping application to be used for protecting bodies of automobiles. Further, in the case of application to be used for airplanes, the thickness is preferably about 50 to 1,000 μm, more preferably about 200 to 800 μm. Moreover, in the case of application to be used for motorcycles, the thickness is preferably about 50 to 800 μm, more preferably about 100 to 600 μm.

The base layer which constitutes the adhesive sheet for protecting coating films of this invention has the coating layer on one surface of the composite film. The coating layer is a fluoroethylene vinyl ether alternating copolymer in which a fluoroethylene unit and a vinyl ether unit are bonded alternately, and is preferably represented by the following formula (I)

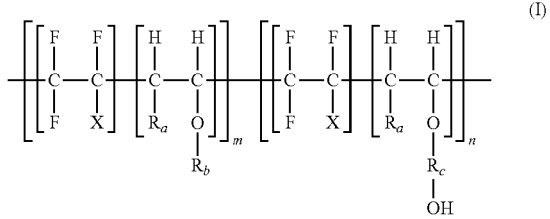

In the formula (I), X represents fluorine, chlorine or bromine, $R_a$ represents hydrogen or an alkyl group of C1-C10, $R_b$ represents an alkyl group of C1-C16, $R_c$ represents an alkylene group of C1-C16. Further, m and n each represent an integer.

The weight-average molecular weight of the fluoroethylene vinyl ether alternating copolymer is 1,000 to 2,000,000, preferably 5,000 to 1,000,000, and more preferably 10,000 to 500,000. In the present invention, m and n in the formula (I) is selected so that the weight-average molecular weight of the fluoroethylene vinyl ether alternating copolymer is within the range of 1,000 to 2,000,000.

The weight-average molecular weight of the fluoroethylene vinyl ether alternating copolymer can be measured by using GPC method. The measuring method of the GPC method will be explained hereinafter. Namely, the concentration of fluoroethylene vinyl ether alternating copolymer is adjusted to be 2.0 g/L by using a THF solution, and is then let stand for 12 hours. After that, this solution is filtered with a membrane filter of 0.45 μm, and the filtrate obtained is GPC-measured under the following conditions by using "HLC-8120GPC" manufactured by TOSOH CORPORATION as an analyzer.

Measuring Conditions:

| Column | TSKgel GMH-H(S) × 2 |
|---|---|
| Column size | 7.8 mm I.D. × 300 mm |
| Eluent | THF |
| Flow rate | 0.5 mL/min. |
| Detector | RI |
| Column temperature | 40° C. |
| Amount to be injected | 100 μL |

The base layer is preferably constituted so that the coating layer is provided on one surface of the composite film, and the adhesive layer is provided on the other surface.

The thickness of the coating layer is preferably 2 to 50 μm, more preferably 5 to 40 μm, and further preferably 8 to 30 μm. When the thickness of the coating layer is less than 2 μm, defect portions where the coating layer is not formed, such as pin holes, are easy to be generated in some cases, and the properties of the coating layer may not be exhibited sufficiently. When the thickness of the coating layer is more than 50 μm, there is a case where the properties of the coating layer cause those of the composite film to be lowered.

In the present invention, it is preferable that the coating layer is cross-linked with the composite film and has cross-linked points. The construction having the cross-linked points may be obtained, for example, by bonding a component which constitutes the coating layer with a component which constitutes the composite film to thereby form cross-linked points. For example, if a residual isocyanate group remains in the isocyanate used for forming the coating layer, the residual isocyanate group can react with the hydroxyl group of the urethane polymer-acrylic-based monomer mixture to form the cross-linked points. Alternatively, if a hydroxyl group remains in the fluoroethylene vinyl ether alternating copolymer to be used for forming the coating layer, the hydroxyl group can react with the isocyanate group in the coating solution for forming the composite film to thereby form the cross-linked points. Therefore, according to the present invention, at the time when the coating solution for forming the composite film is applied, the residual isocyanate group or residual hydroxyl grouping the coating layer is required to exist in a reactive state. In addition, it is preferable that the coating solution for forming the composite film is applied before the cross-linking reaction in the coating layer has been entirely completed.

As mentioned above, when the coating layer and the composite film form the cross-linking structure, excellent adhesion can be obtained, and thus the coating layer (the surface coating layer) can maintain the adhesion strength to the composite film for a long time. Therefore, if an application sheet is adhered to the surface coating layer in order to position the adhesive sheet for protecting coating films, the surface coating layer would not be peeled off, when the application sheet is removed.

In order that the surface coating layer and the composite film form the cross-linking structure, the surface coating layer is required to be prepared by using the fluoroethylene vinyl ether alternating copolymer, and is required to have the aforementioned structure as the composite film.

In the present invention, the cross-linking structure may be formed by any method, in so far as the surface coating layer and the composite film can form the cross-linking structure. For example, after the surface coating layer is applied, dried and cured, the coating solution for forming the composite film is applied to the surface coating layer in a semi-cured state to thereby form the cross-linked points, or if the residual isocyanate group is able to react, the coating solution for forming the composite film is applied to the surface coating layer even in a completely cured state to thereby form the cross-linked points. Preferably the forming method is appropriately designed in consideration of the type and amount of the components to be used for forming the coating layer and the composite film. For example, if the residual isocyanate group is in a state capable of reacting, the coating solution for forming the composite film is applied within 24 hours and is subject to photocuring reaction, to thereby be capable of forming the cross-linking structure. If the residual isocyanate group is in a state capable of reacting and kept under about 5° C., the coating solution for forming the composite film is applied within 5 days and is subject to photocuring reaction, to thereby be capable of forming the cross-linking structure. Meanwhile, if a hydroxyl-containing monomer is caused to previously react with the isocyanate cross-linking agent, even after keeping at 50° C. for one week or more, it is possible to put the residual isocyanate group into a state of capable of reacting.

In the present invention, the coating layer is formed by dissolving the fluoroethylene vinyl ether alternating copolymer in a solvent, adding thereto a polyfunctional isocyanate to prepare the coating solution for forming the coating layer, and then using this prepared coating solution. For example, this coating solution is applied to a peeling-treated polyethylene film, and dried to form the coating layer. To the coating layer, a mixture containing the urethane polymer and the acrylic-based monomer (coating solution for forming the composite film) is applied, which was then irradiated with ultraviolet ray to thereby be able to obtain a laminated article having a structure in which the coating layer is cross-linked to the composite film (the composite film is cross-linked to the coating layer).

Alternatively, after causing the hydroxyl-containing monomer to react with the polyfunctional isocyanate, the fluoroethylene vinyl ether alternating copolymer is added, thereby a solution for coating layer is prepared. The coating layer is formed by applying the solution obtained. For example, this solution for coating layer is applied to a peeling-treated PET film, and dried to form the coating layer. To the coating layer, a coating solution for forming the composite film containing the acrylic-based monomer and the urethane polymer is applied, which was then irradiated with ultraviolet ray to be cured to thereby obtain a laminated article having a structure where the coating layer is cross-linked to the composite film (the composite film is cross-linked to the coating layer).

The aforementioned polyfunctional isocyanate is one that contains two or more of isocyanate groups in one molecule. Examples of the polyfunctional isocyanate include, for example, a bifunctional isocyanate such as hydrogenated xylylene diisocyanate, hexamethylene diisocyanate, isophorone diisocyanate, hydrogenated diphenylmethane diisocyanate, ethylene diisocyanate, 1,4-tetramethylene diisocyanate, trimethylhexamethylene diisocyanate or norbornene diisocyanate, a trifunctional isocyanate such as DESMODUR N3200 (manufactured by SUMIKA BAYER URETHANE CO. LTD.), COLONATE L (manufactured by NIPPON POLYURETHANE INDUSTRY, CO. LTD.), COLONATE HL (manufactured by NIPPON POLYURETHANE INDUSTRY, CO. LTD.), COLONATE HX (manufactured by NIPPON POLYURETHANE INDUSTRY, CO. LTD.), TAKENATE D-140N (manufactured by MITSUI CHEMICAL POLYURETHANE INC.), TAKENATE D-127 (manufactured by MITSUI CHEMICALPOLYURETHANEINC.) or TAKENATE D-110N (manufactured by MITSUI CHEMICAL POLYURETHANE INC.). In the present invention, the polyfunctional isocyanate maybe used alone or in combination of two or more.

When causing the hydroxyl-containing monomer to react with the polyfunctional isocyanate, a ratio ([OH]/[NCO]) of the mole number of hydroxyl group [OH] of the hydroxyl-containing monomer relative to the mole number of isocyanate group [NCO] of the polyfunctional isocyanate is 0.05 to 0.5, preferably 0.05 to 0.4, more preferably 0.05 to 0.3.

The aforementioned hydroxyl-containing monomer is one that contains one or more of hydroxyl group in one molecular and one or more of (meth)acrylic group in one molecular. The hydroxyl group-containing monomer include, for example, 2-hydroxyethyl acrylate, 2-hydroxy methacrylate, 4-hydroxybutyl acrylate, 4-hydroxybutyl methacrylate, 1,4-cyclohexanedimethanol monoacrylate, 1,4-cyclohexanedimethanol monomethacrylate, 2-hydroxypropyl acrylate, 2-hydroxypropyl methacrylate, pentaerythritol acrylate, and the like. In the present invention, the hydroxyl group-containing monomer may be used alone or in combination of two or more.

In the base layer according to the present invention, within the range not diminishing the effects of the present invention, one surface of the composite film (surface to which the coating layer is not provided) can be laminated with other film. The materials for forming the other film include, for example, a polyester-based resin such as polyethylene terephthalate (PET), a polyolefin-based resin such as polyethylene (PE) or polypropylene (PP), a thermoplastic resin such as polyimide (PI), polyether ether ketone (PEEK), polyvinylchloride (PVC), polyvinylidene chloride-based resin, polyamide-based resin, polyurethane-based resin, polystyrene-based resin, acrylic-based resin, foluorine-containing resin, cellulose-based resin or polycarbonate-based resin, and in addition, a thermosetting resin, and the like. When the aforementioned coating layer is provided, it is preferable that the coating layer is positioned as the outermost layer of the base layer.

The adhesive sheet for protecting coating films of the present invention has an adhesive layer on the surface being opposite to the surface of the base layer where the coating layer is provided. A adhesive constructing the adhesive layer is not particularly limited and there can be used a general adhesive such as acrylic-based adhesive, rubber-based adhesive, or silicone-based adhesive. It is preferably that the acrylic-based adhesive is used in view of adhesion property at a low temperature, holding property at a high temperature, cost performance, and the like.

As the acrylic-based adhesive, there can be used an acrylic-based adhesive containing an acrylic-based copolymer (may be two or more) prepared by copolymerizing a monomer component containing an acrylic acid ester as a main component with a monomer component having a functional group such as carboxyl group or hydroxyl group.

Examples of the acrylic acid esters include, for example, methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, isopentyl (meth)acrylate, hexyl (meth)acrylate, cyclohexyl (meth)acrylate, heptyl (meth)acrylate, n-octyl (meth)acrylate, isoctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, isobornyl (meth)acrylate, 1-adamantly (meth)acrylate, and the like. The alkyl (meth) acrylate may be used alone or two or more.

The following monomer component can be copolymerized with the aforementioned alkyl (meth)acrylate. The coplymerizable monomers include, for example, a monomer having carboxyl group such as (meth)acrylic acid, itaconic acid, maleic acid, crotonic acid, fumaric acid, carboxyethyl (meth)acrylate or carboxypentyl (meth)acrylate; a monomer having hydroxyl group such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate or (4-hydroxymethylcyclohexyl)-methacrylate; a monomer having glycidyl group such as glycidyl (meth)acrylate or methylglycidyl (meth)acrylate; a cyanoacrylate-based monomer such as acrylonitrile or methacrylonitrile; a nitrogen-containing monomer such as N,N-dimethylaminoethyl (meth)acrylate, N,N-dimethylaminopropyl (meth)acrylamide, N,N-dimethyl (meth)acrylamide, N,N-diethyl (meth)acrylamide, N-isopropyl (meth)acrylamide, N-hydroxyethyl (meth)acrylamide, (meth)acryloylmorpholine, N-vinyl-2-piperidone, N-vinyl-3-morpholine, N-vinyl-2-caprolactam, N-vinyl-2-pyrrolidone, N-vinyl-1,3-oxazine-2-one, N-vinyl-3,5-morpholinedione, N-cyclohexyl maleimide, N-phenyl maleimide, N-acryloyl pyrrolidine or t-butylaminoethyl (meth)acrylate, a monomer such as styrene, a styrene derivative or vinyl acetate, and the like. One or two or more of these monomers can be used by copolymerizing with the (meth)acrylic acid ester, if necessary.

The adhesive used in the present invention contains preferably at least one selected from the group consisting of 2-ethylhexyl acrylate and isononyl acrylate, and at least one of the carboxyl group-containing monomer selected from the group consisting of acrylic acid and methacrylic acid. Namely, as the adhesives to be used in the present invention, there can be used a copolymer prepared by copolymerizing a main monomer such as 2-ethylhexyl acrylate or isononyl acrylate with the carboxyl group-containing monomer such as acrylic acid or methacrylic acid.

The thickness of the adhesive layer is not particularly limited, and may be set optionally. Usually, the thickness of the adhesive layer is preferably 20 μm or more, more preferably 30 μm or more, particularly preferably 40 μm or more. However, usually, the upper limit is preferably around 100 μm.

In the present invention, the adhesive layer may be prepared, for example, according to a method in which a solvent-based or emulsion-based adhesive is directly applied to the base layer, and then dried, a method in which an adhesive layer is previously prepared by applying the adhesive to a release paper, and then the adhesive layer is laminated to the composite film, and the like. Also, there can be employed a method in which a radioactive curable adhesive is applied to the base layer, and then both of the adhesive layer and the film are irradiated with a radioactive ray to thereby cure the base layer and the adhesive layer simultaneously and to form the adhesive layer. In such a case, the adhesive layer and the base layer can also be applied so that these layers form a multilayered structure.

The adhesive sheet for protecting coating films has preferably a 100% modulus of 1.0 MPa or more and 10.0 MPa or less, more preferably 1.5 MPa or more and 8.0 MPa or less, particularly preferably 2.0 MPa or more and 6.0 MPa or less. When the adhesive sheet has the 100% modulus of 1.0 MPa or more at 23° C., the adhesive sheet for protecting coating films never exhibit excessive flexibility so as to prevent bending work. Further, when the 100% modulus is 10.0 MPa or less, the adhesive sheet for protecting coating films never exhibit excessive rigidity so as to lower follow-up property to the coated curved surface, and generate floating.

The 100% modulus herein is a 100% modulus at 23° C. and means a stress per unit area at 100% elongation of the adhesive sheet which is calculated from a stress-strain curve obtained by being carried out tensile test under a tensile speed of 200 mm/min, a distance between chucks of 50 nun at room temperature (23° C.).

The adhesive sheet for protecting coating films has preferably a elongation at break of 200% or more and 1,000% or less, more preferably 250% or more and 800% or less, particularly preferably 300% or more and 600% or less. When the elongation at break is 200% or more, lamination work is never prevented because the adhesive sheet elongates sufficiently at the time of lamination. Also, when the breaking elongation is 1,000% or less, the adhesive sheet never elongates too long at the time of lamination so as to prevent the lamination work.

The elongation at break herein means a value calculated by dividing an elongation at the time when the adhesive sheet is broken by a distance between chucks (50 mm), when tensile test is carried out by using an adhesive sheet (1 cm width, 13 cm length) under a tensile speed of 200 mm/min, a distance between chucks of 50 mm at room temperature (23° C.).

The adhesive sheet for protecting coating films has preferably a breaking strength of 10 MPa or more and 100 MPa or less, more preferably 15 MPa or more and 90 MPa or less, and particularly preferably 20 MPa or more and 80 MPa or less. When the breaking strength is less than 10 MPa, there is a case where the adhesive sheet becomes too soft to lower chipping resistance. Namely, when pebbles and the like knock the adhesive sheet, there is a case where the surface thereof is damaged to lower good appearance of the coating of automobiles. When the breaking strength is more than 100 MPa, there is a case where the adhesive sheet becomes too rigid to lower follow-up property to the coated curved surface of automobiles, and to generate floating.

The breaking strength herein means a force at the time when the adhesive sheet is broken by carrying out tensile test through the use of an adhesive sheet (1 cm width, 13 cm length) under a tensile speed of 200 mm/min, a distance between chucks of 50 mm at room temperature (23° C.).

The adhesive sheet for protecting coating films according to the present invention is required to be transparent in order to show the color and the like of the coated surface of a body to be applied as it is. The adhesive sheet may be used as a painted replaceable adhesive sheet which is colored with the same color as that of the coated surface by using pigments and the like, or the different colors.

To the adhesive sheet for protecting coating films according to the present invention, an application sheet may be used for improving lamination workability of the adhesive sheet for protecting coating films, for example, work to position the laminating point, and the like.

The preparation method of the adhesive sheet for protecting coating films according to the present invention is explained hereinafter. For example, firstly, the coating solution for surface coating layer is applied to the peeling-treated surface of the peeling-treated polyethylene terephthalate film (temporary support 1) to form the surface coating layer. After that, the coating solution for composite films is applied to the surface coating layer, and, after a separator is put thereon, irradiation of ultraviolet rays or the like is carried out from upper side of the separator so as to form the composite film and also cross-linked points. Thereafter, the separator is removed. Separately, the coating solution for adhesive layer is applied to the peeling-treated surface of the peeling-treated polyester film (temporary support 2) to form the adhesive layer. Subsequently, the adhesive layer is laminated to the composite film to obtain the adhesive sheet for protecting coating films. In addition, although this layer construction is the peeling-treated polyethylene terephthalate film (temporary support 1)/the surface coating layer/the composite film/ the adhesive layer/the peeling-treated polyester film (temporary support 2), the temporary support 1 and the temporary support 2 are not particularly included in the elements of the adhesive sheet for protecting coating films according to the present invention, because they are peeled off when used, that is, at the time when the adhesive sheet is used for adherence. However, if necessary, it is possible to provide the temporary support 1, the temporary support 2, and the like appropriately, and thus the technical scope according to the present invention includes these constructions.

The adhesive sheet for protecting coating films of the present invention has both the high strength and high elongation at break, and further has excellent flexibility for a curved surface. In addition, according to the adhesive sheet for protecting coating films of the present invention, since the coating layer strongly is adhered to the composite film, for example, when the positioning is done by using the application sheet at lamination work, the coating layer could not be peeled off. Therefore, the adhesive sheet is suitable for protecting coated surfaces of transport machines such as motorcycles, bicycles, railway vehicles, ships, snow mobiles, gondolas, lifts, escalator, automobiles and airplanes, particularly, automobiles, airplanes, motorcycles.

EXAMPLES

The present invention will be explained in detail by Examples in the following, but the invention is not to be limited thereto. In the following Examples, unless otherwise noted, and unless there is a problem based on general common sense, part means part by weight, % means % by weight. The measuring methods and evaluation methods used in the following Examples are shown below.
(Measuring Methods and Evaluation Methods)
(1) Evaluation of Weather Resistance (Resistance to Yellowing)

The adhesive sheet for protecting coating films was adhered under pressure to a white coated plate
(Manufactured by Nippon Testpanel Co., Ltd., a dull stainless steel plate "JIS-G3141" on which a white acrylic paint is baked.) by making a roller of 2 kg one round trip. After it was allowed to stand for 24 hours at 23° C., irradiation was carried out for 1,000 hours by using a sunshine weatherometer tester (manufactured by Suga Test Instrument Co., Ltd.). By observing the adhesive sheet for protecting coating films with naked eyes, appearance of discoloration (yellowing) was confirmed.
(2) Evaluation of Solvent Resistance The adhesive sheet for protecting coating films was adhered under pressure to a white coated plate (Manufactured by Nippon Testpanel Co., Ltd., a dull stainless steel plate "JIS-G3141" on which a white acrylic paint is baked.) by making a roller of 2 kg one round trip. After being allowed to stand for 24 hours at 23° C., the laminate was immersed in gasoline for 10 minutes at 23° C., change was observed with naked eyes.
(3) Evaluation of Stain-Adhering Resistance The adhesive sheet for protecting coating films was adhered under pressure to a white coated plate (Manufactured by Nippon Testpanel Co., Ltd., a dull stainless steel plate "JIS-G3141" on which a white acrylic paint is baked.) by making a roller of 2 kg one round trip. After being allowed to stand for 24 hours at 23° C., pebbles of 2 to 5 mm diameter were thrown at 0.4 MPa to the adhesive sheet by using the throwing stone testing machine (manufactured by Suga Test Instrument Co., Ltd.). Subsequently, the stain on the surface of the adhesive sheet for protecting coating films was wiped with a cloth, presence of the stain was observed. A case where the stain was wiped out is represented by "Non adhesion", and a case where the stain was not wiped out was represented by "Adhesion remains".
(4) Evaluation of Anchoring The adhesive sheet for protecting coating films was adhered under pressure to a white coated plate (Manufactured by Nippon Testpanel Co., Ltd., a dull stainless steel plate "JIS-G3141" on which a white acrylic paint is baked.) by using a hand roller, and then on the coating layer an application tape ("SPV3620" manufactured by NITTO DENKO CORPORATION) was adhered under pressure by making a hand roller one round trip. After being allowed to stand for 72 hours at 23° C., the application tape was peeled off at a tensile speed of 50 mm/min. at an angle of 120 degree by using a high speed peeling test machine (manufactured by KABUSHIKI KAISHA KOKEN SHA), the peeling state of the coating layer was observed with naked eyes.
(5) Evaluation of Transparency As the evaluation of transparency, a haze value of adhesive sheet for protecting coating films was measured by using a haze meter. Namely, after adhering the adhesive sheet for protecting coating films to a glass plate (MICRO SLIDE GLASS, size: 45 mm×50 mm, thickness: 1.2 mm to 1.5 mm, Pre-Cleaned, manufactured by MATSUNAMI GLASS INDUSTRIES), a haze (Haze value) was measured by using a haze meter (Haze Meter "HM150 Type" manufactured by MURAKAMI COLOR RESEARCH LABORATORY). A haze value of 3.0 or less is acceptance level in view of evaluation of transparency.

Example 1

<<Preparation of Coating Solution for Composite Films>>

In a reactor equipped with a condenser, a thermometer, and an agitator were supplied 10 parts of acrylic acid (AA), 20 parts of acryloylmorphorine, and 20 parts of t-butyl acrylate (BA) as acrylic-based monomers, 36.4 parts of polyoxytetramethylene glycol (PTMG) (number-average molecular weight 650, manufactured by Mitsubishi Chemical Corporation) as a polyol, and while agitating, 13.6 parts of hydrogenated xylylene diisocyanate (HXDI) was dripped and the mixture was allowed to react at 65° C. for 10 hours to obtain a urethane polymer-acrylic-based monomer mixture.

After that, a mixture of a urethane polymer and an acrylic-based monomer (coating solution for composite films) was prepared by adding 0.3 part of bis(2,4,6-trimethylbenzoyl)-phenylphosphine oxide ("IRGACURE 819" manufactured by CIBA SPECIALTY CHEMICALS) as a photopolymerization initiator, 1.25 part of a ultraviolet absorber of 1-methoxy-2-propanol and a reaction product of 2-(4,6-bis(2,4-dimethylphenyl)-1,3,5-triazine-2-yl)-5-hydroxyphenyl and oxirane [(C10-C16, mainly C12-C13 alkyloxy) methyl oxirane] ("TINUVIN 400" manufactured by CIBA SPECIALTY CHEMICALS) as a ultraviolet absorber, and 1.25 part of a reaction product of decanedioic acid bis(2,2,6,6-tetramethyl-1-(octyloxy)-4-piperidyl) ester, 1,1-dimethylethylhydroperoxide and octane ("TINUVIN 123" manufactured by CIBA SPECIALTY CHEMICALS) as a light stabilizer. However, the amounts of the polyisocyanate component and the polyol component used were such that NCO/OH (equivalent ratio)=1.25.

<<Preparation of Coating Solution for Coating Layers>>

A coating solution for coating layers (solid content 28%) was prepared by adding 10.15 parts of an isocyanate cross-linking agent ("COLONATE HX" manufactured by NIPPON POLYURETHANE INDUSTRY CO., LTD.) as a curing agent, 3.5 parts of a xylene-diluted solution (solid content of 0.01%) of dibutyltin laurate ("OL1" manufactured by Tokyo Fine Chemical CO., LTD.) as a catalyst, and 101 parts of toluene as a dilute solvent relative to 100 parts of a 50% concentration solution of a fluoroethylene vinyl ether in toluene and xylene ("LF600" manufactured by ASAHI GLASS CO. LTD.).

<<<Production of Base Layers>>

The coating solution for coating layers obtained was applied to a peeling-treated polyethylene terephthalate film (75 μm thick) as a temporary support 1, dried and cured at 140° C. for 3 minutes to form a fluoroethylene vinyl ether layer. The thickness of the coating layer after formed into the adhesive sheet was 10 μm.

After forming the coating layer, namely within 24 hours after curing, the coating solution for composite films prepared was applied to the coating layer so that a thickness After curing was 290 μm (300 μm including the thickness of the surface coating layer), and then, a peeling-treated polyethylene terephthalate (PET) film was laminated thereon as a separator. The surface of PET film was irradiated with ultraviolet ray for curing (illuminance 290 mW/cm$^2$, light amount 4,600 mJ/cm$^2$) by using a metal halide lamp to form the coating layer and the composite film on the temporary support 1.

<<Production of Adhesive Layers>>

0.05 part of "IRGACURE 651" trade name (manufactured by CIBA SPECIALTY CHEMICALS) and 0.05 part of "IRGACURE 184" trade name (manufactured by CIBA SPECIALTY CHEMICALS) as photopolymerization initiators were blended with a mixture of 90 parts of 2-ethylhexylacrylate and 10 parts of acrylic acid as monomer components, which was then irradiated with ultraviolet ray until its viscosity was about 15 Pa·s (BH viscometer No. 5 rotor, 10 rpm, measuring temperature 30° C.) to produce a partially polymerized acrylic composition (UV syrup).

An adhesive composition was produced by adding 0.08 part of hexanediol diacrylate and 1 part of a hindered phenol type antioxidant (trade name "IRGANOX 1010" manufactured by CIBA SPECIALTY CHEMICALS) relative to 100 parts of the UV syrup obtained.

The adhesive composition was applied to the peeling-treated surface of a polyester film of 38 μm thick as a temporary support 2 so that a thickness of the final product was 50 μm.

A peeling-treated PET film was laminated thereon as a separator, and then, the surface of PET film was irradiated with ultraviolet ray for curing (illuminance 290 mW/cm$^2$, light amount 4,600 mJ/cm$^2$) by using a metal halide lamp to form an adhesive layer on the temporary support 2. After that, an adhesive layer was formed by drying at 140° C. for 3 minutes to dry the residual unreacted acrylic monomer.

<<Production of Adhesive Sheets>>

After removing the separator, the adhesive layer was adhered so as to overlap with the surface of the substrate layer obtained, being opposite to the surface where the coating layer was provided, to thereby produce an adhesive sheet for protecting coating films (layer structure of temporary support 1/coating layer/composite film/adhesive layer/temporary support 2).

<<Measurement and Evaluation>>

The adhesive sheet thus obtained was evaluated according to the aforementioned evaluation methods, with respect to weather resistance, solvent resistance, stain-adhering resistance, anchoring, transparency. The results are shown in TABLE 1.

Example 2

The adhesive sheet for protecting coating films was produced in the same manner as in EXAMPLE 1 except that the coating solution for composite films was modified to the following.

<<Preparation of Coating Solution for Composite Films>>

In a reactor equipped with a condenser, a thermometer, and an agitator were supplied 10 parts of acrylic acid (AA), 20 parts of isobornyl acrylate (IBXA), and 20 parts of t-butyl acrylate (BA) as acrylic-based monomers, 36.4 parts of polyoxytetramethylene glycol (PTMG) (number-average molecular weight 650, manufactured by Mitsubishi Chemical Corporation) as a polyol, and while agitating, 13.6 parts of hydrogenated xylylene diisocyanate (HXDI) was dripped and the mixture was allowed to react at 65° C. for 10 hours to obtain a urethane polymer-acrylic-based monomer mixture.

After that, a mixture of a urethane polymer and an acrylic-based monomer (coating solution for composite films) was obtained by adding 0.3 part of bis(2,4,6-trimethylbenzoyl) phenyl-phosphine oxide ("IRGACURE 819" manufactured by CIBA SPECIALTY CHEMICALS) as a photopolymerization initiator, 1.25 part of 2,5-hydroxyphenyl and oxirane 1-methoxy-2-propanol ("TINUVIN 400" manufactured by CIBA SPECIALTY CHEMICALS) as a ultraviolet absorber, and 1.25 part of a hinderd-amine light stabilizer of decanedioic acid bisester, 1,1-dimethylethylhydroperoxide and octane ("TINUVIN 123" manufactured by CIBA SPECIALTY CHEMICALS) as a light stabilizer. The amounts of the polyisocyanate component and the polyol component used were such that NCO/OH (equivalent ratio)=1.25.

The thus obtained adhesive sheet was subjected to measurements and evaluations in the same manner as in EXAMPLE 1. The results are shown in TABLE 1.

Example 3

The adhesive sheet for protecting coating films was prepared in the same manner as in EXAMPLE 1 except that the coating solution for coating layers was changed with the following.

<<Preparation of Coating Solution for Coating Layers>>

A reaction solution was obtained by mixing 0.7 part of 4-hydroxybutyl acrylate ("4HBA" manufactured by NIPPON KASEI CO., LTD.) and 11.2 parts of an isocyanate-based cross-linking agent ("COLONATE HX" manufactured by NIPPON POLYURETHANE INDUSTRY CO., LTD.), and causing them to react. A coating solution for coating layers (slid content 28%) was prepared by adding 11.9 parts of the reaction solution obtained as a curing agent, 3.5 parts of a xylene-diluted solution (solid content of 0.01%) of dibutyl-tin laurate ("OL1" manufactured by Tokyo Fine Chemical CO., LTD.) as a catalyst, and 101 parts of toluene as a diluting solvent relative to 100 parts of a 50% solution of a fluoroethylene vinyl ether in toluene and xylene ("LF600" manufactured by ASAHI GLASS CO. LTD.).

The thus obtained adhesive sheet was subjected to measurements and evaluations in the same manner as in EXAMPLE 1. The results are shown in TABLE 1.

Example 4

An adhesive sheet was obtained by preparing a composite film in the same manner as in EXAMPLE 1 except that the production of the base layer in EXAMPLE 1 was modified to the following.

Specifically, within 24 hours after forming the coating layer in the same manner as in EXAMPLE 1, namely after curing, to the coating layer was applied the coating solution for composite films prepared in the same manner as in EXAMPLE 1 so that a thickness after curing was 490 μm (500 μm including the thickness of the surface coating layer), and then, a peeling-treated polyethylene terephthalate (PET) film was laminated thereon as a separator. The surface of PET film was irradiated with ultraviolet rays for curing (illuminance 290 mW/cm$^2$, light amount 4,600 mJ/cm$^2$) by using a metal halide lamp to thereby form the coating layer and the composite film on the temporary support 1.

An adhesive sheet was prepared in the same manner as in EXAMPLE 1.

The adhesive sheet thus obtained was subjected to measurements and evaluations in the same manner as in EXAMPLE 1. The results are shown in TABLE 1.

Comparative Example 1

An adhesive sheet for protecting coating films was produced in the same manner as in EXAMPLE 1 except that the coating layer was not provided. The adhesive sheet thus obtained was subjected to evaluations in the same manner as in EXAMPLE 1. The results are shown in TABLE 1.

Comparative Example 2

An adhesive sheet for protecting coating films where a polyvinylidene fluoride (PVDF) coating layer instead of the fluoroethylene vinyl ether coating layer was produced in the same manner as in EXAMPLE 1 except that the production of the coating layer was changed with the following.

Namely, as a coating solution for coating layers, a polyvinylidene fluoride (PVDF) solution ("L#1120" manufactured by KUREHA CORPORATION, N-methyl-2-pyrroridone solution of 10% PVDF) was used. This PVDF solution was applied to a polyethylene terephthalate film of 100 μm thick as a temporary support 1, and dried at 150° C. for 3 minutes to produce a PVDF layer (coating layer) of 5 μm thick.

The adhesive sheet thus obtained was subjected to evaluations in the same manner as in EXAMPLE 1. The results are shown in TABLE 1.

TABLE 1

|  | Ex. 1 | Ex. 2 | Ex. 3 | Ex. 4 | Comp. Ex. 1 | Comp. Ex. 2 |
| --- | --- | --- | --- | --- | --- | --- |
| Weather resistance | No Color change | No Color change | No Color change | No Color change | No Color change | No Color change |
| Solvent resistance | No change | No change | No change | No change | No change | No change |
| Stain adhering resistance | No adhesion | No adhesion | No adhesion | No adhesion | Adhesion | No adhesion |
| Anchoring property | No peeling | No peeling | No peeling | No peeling | — | Partially peeled |
| Transparency | (0.9) High transparency | (0.8) High transparency | (0.8) High transparency | (0.6) High transparency | (0.8) High transparency | (4.8) Low transparency |

Note)
In the evaluation of transparency, numeral in parentheses is a haze value.

As is obvious from TABLE 1, the results of EXAMPLEs 1 to 4 where the composite films were formed in the state in which the reactive residues remained on the surface of the coating layer were remarkably excellent in anchoring property. Especially, the adhesive sheet of EXAMPLE 3 is extremely excellent in anchoring property, and exhibited stronger anchoring property than that of EXAMPLE 1. This is because the hydroxyl-containing monomer reacted previously with the isocyanate-based cross-linking agent in the production of the coating solution for coating layers, and the coating solution for coating layers was cross-linked with the composite film. When the coating solution for coating layers of EXAMPLE 3 was used, it was confirmed that, even after a lapse of one week at 50° C. from the formation of the coating layer, the anchoring property appeared. Meanwhile, when the coating solution for coating layers of EXAMPLE 1 was used, the anchoring property did not appear in about one week at 50° C.

In addition, it has been found that the adhesive sheets of EXAMPLEs 1 to 4 which satisfy the subject matter of the present invention did not turn yellow even exposed to ultra-violet rays for a long time, and they were excellent in weather resistance, and excellent in all of solvent resistance, stain adhering resistance, and transparency.

It has been found that adhesion of stain occurred in the adhesive sheet of COMPARATIVE EXAMPLE 1 without a coating layer. In addition, in COMPARATIVE EXAMPLE 2 where the coating layer was made of the fluororesin other than the present invention, there was a problem in anchoring property, for example, when positioning was done by using an application sheet, a part of the coating layer was peeled off.

Further, because the sheets of EXAMPLEs 1 to 4 have the composite film containing the urethane polymer and the acrylic polymer, they are excellent in mechanical strength and flexibility, and can sufficiently follow a body to be adhered, for example, a curved surface of automobile body.

Industrial Applicability

The adhesive sheet for protecting coating film according to the present invention can be used suitably as an adhesive sheet to which flexibility for a curved surface and the like is required. In addition, because the adhesive sheet for protecting coating film according to the present invention is excellent in adhesion property between the coating layer and the composite film, and is excellent in stain proof property, it can be used, for example, as an adhesive sheet for protecting surfaces of a coating film which is exposed under harmful environment including weather in outdoor, solvents, dusts, fats, ocean environments, and the like. Further, it is suitable as an adhesive sheet for protecting coating films of automobiles.

The invention claimed is:

1. An adhesive sheet for protecting coating films comprising a base layer and an adhesive layer, wherein the base layer has a coating layer produced by using a fluoroethylene vinyl ether alternating copolymer represented by the following formula (I) on one surface of a composite film containing an acrylic-based polymer and a urethane polymer

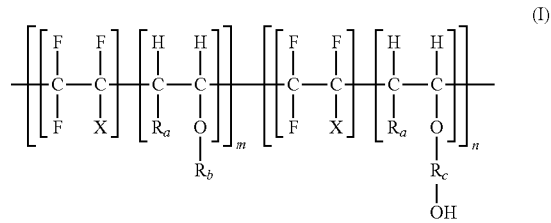

wherein X represents fluorine, chlorine or bromine, $R_a$ represents hydrogen or an alkyl group with C1 to C10, $R_b$ represents an alkyl group with C1 to C16, $R_c$ represents an alkylene group with C1 to C16, m and n each represent an integer, and are selected so that a weight-average molecular weight of the fluoroethylene vinyl ether alternating copolymer is within the range of 1,000 to 2,000,000, wherein the adhesive sheet for protecting coating films has a structure in which the composite film and the coating layer are cross-linked and have cross-linked points, and wherein the adhesive sheet comprises the coating layer, the composite film and the adhesive layer in this order.

2. The adhesive sheet for protecting coating films according to claim 1, wherein the cross-linked points are formed by forming the coating layer through the use of a solution which is prepared by dissolving the fluoroethylene vinyl ether alternating copolymer in a solvent and then adding an isocyanate thereto, and forming the composite films by applying a coating solution for forming the composite film to the coating layer.

3. The adhesive sheet for protecting coating films according to claim 2, wherein the composite film is produced by using a coating solution for forming composite film produced by adding a photopolymerization initiator to a solution containing an acrylic-based monomer and a urethane polymer produced by causing a diol to react with a diisocyanate in the acrylic monomer.

4. The adhesive sheet for protecting coating films according to claim 2, wherein an adhesive forming the adhesive layer contains at least one type of copolymers of at least one selected from the group consisting of 2-ethylhexyl acrylate and isononyl acrylate, and at least one selected from the group consisting of acrylic acid and methacrylic acid.

5. The adhesive sheet for protecting coating films according to claim 2, wherein the adhesive sheet is used by being adhered to an outer coating surface of transport machines.

6. The adhesive sheet for protecting coating films according to claim 1, wherein the cross-linked points are formed by forming the coating layer through the use of a mixture which is produced by adding a solution prepared by dissolving the fluoroethylene vinyl ether alternating copolymer in a solvent, to a reaction solution obtained by causing a hydroxyl-containing monomer to react with a polyfunctional isocyanate, and forming the composite films by applying a coating solution for forming the composite film on the coating layer.

7. The adhesive sheet for protecting coating films according to claim 6, wherein the composite film is produced by using a coating solution for forming composite film produced by adding a photopolymerization initiator to a solution containing an acrylic-based monomer and a urethane polymer produced by causing a diol to react with a diisocyanate in the acrylic monomer.

8. The adhesive sheet for protecting coating films according to claim 6, wherein an adhesive forming the adhesive layer contains at least one type of copolymers of at least one selected from the group consisting of 2-ethylhexyl acrylate and isononyl acrylate, and at least one selected from the group consisting of acrylic acid and methacrylic acid.

9. The adhesive sheet for protecting coating films according to claim 6, wherein the adhesive sheet is used by being adhered to an outer coating surface of transport machines.

10. The adhesive sheet for protecting coating films according to claim 1, wherein the composite film is produced by using a coating solution for forming composite film produced by adding a photopolymerization initiator to a solution containing an acrylic-based monomer and a urethane polymer produced by causing a diol to react with a diisocyanate in the acrylic monomer.

11. The adhesive sheet for protecting coating films according to claim 10, wherein an adhesive forming the adhesive layer contains at least one type of copolymers of at least one selected from the group consisting of 2-ethylhexyl acrylate and isononyl acrylate, and at least one selected from the group consisting of acrylic acid and methacrylic acid.

12. The adhesive sheet for protecting coating films according to claim 10, wherein the adhesive sheet is used by being adhered to an outer coating surface of transport machines.

13. The adhesive sheet for protecting coating films according to claim 1, wherein an adhesive forming the adhesive layer contains at least one type of copolymers of at least one selected from the group consisting of 2-ethylhexyl acrylate and isononyl acrylate, and at least one selected from the group consisting of acrylic acid and methacrylic acid.

14. The adhesive sheet for protecting coating films according to claim 13, wherein the adhesive sheet is used by being adhered to an outer coating surface of transport machines.

15. The adhesive sheet for protecting coating films according to claim 1, wherein the adhesive sheet is used by being adhered to an outer coating surface of transport machines.

\* \* \* \* \*